United States Patent [19]

Johnson

[11] Patent Number: 4,727,854

[45] Date of Patent: Mar. 1, 1988

[54] HIGH EFFICIENCY INFRARED RADIANT ENERGY HEATING SYSTEM AND REFLECTOR THEREFOR

[76] Inventor: Arthur C. W. Johnson, 2611 Lake Charnwood, Troy, Mich. 48084

[21] Appl. No.: 860,901

[22] Filed: May 8, 1986

[51] Int. Cl.⁴ .............................................. F24C 3/04
[52] U.S. Cl. ................................ 126/92 B; 126/91 A; 431/328; 431/329; 431/215; 237/1 R; 165/146; 165/901
[58] Field of Search ................ 126/85 R, 91 R, 91 A, 126/87, 86, 92 B, 92 C, 92 AC; 431/302, 347, 348, 326, 328, 329, 215; 237/1 R; 165/146, DIG. 2

[56] References Cited

U.S. PATENT DOCUMENTS

| | | | |
|---|---|---|---|
| 2,159,149 | 5/1939 | Hart | 126/92 B |
| 2,759,472 | 8/1956 | Cartter | 126/92 B |
| 2,946,510 | 7/1960 | Galvin | 126/91 A X |
| 3,087,041 | 4/1963 | Vonk | 431/347 X |
| 3,790,333 | 2/1974 | Padovani et al. | 126/92 B X |
| 3,805,763 | 4/1974 | Cowan | 126/92 B |
| 4,269,590 | 5/1981 | Baumannus | 126/92 B |
| 4,319,125 | 3/1982 | Prince | 237/70 X |
| 4,529,123 | 7/1985 | Johnson | 126/92 AC X |
| 4,541,407 | 9/1985 | Sommers et al. | 431/328 X |

FOREIGN PATENT DOCUMENTS 1315685 5/1973 United Kingdom ............. 126/92 B

Primary Examiner—Larry Jones
Attorney, Agent, or Firm—Krass & Young

[57] ABSTRACT

An insulated reflector for a low-intensity radiant energy heating system. Several embodiments are disclosed. In one embodiment, the reflector forms a chamber which is used to preheat fresh air admitted to the heated area.

15 Claims, 7 Drawing Figures

4,727,854

HIGH EFFICIENCY INFRARED RADIANT ENERGY HEATING SYSTEM AND REFLECTOR THEREFOR

INTRODUCTION

This invention relates to low intensity infrared radiant heating systems of the type in which the infrared emitter is a metal tube which is charged with hot gaseous effluent by means of a fuel fired burner. More particularly the invention relates to improved radiant energy reflectors and to systems which include tube-type emitters and reflectors in combination.

BACKGROUND OF THE INVENTION

Low intensity radiant infrared heating systems of the type described above are preferred over forced air and hot water systems, for example, in many applications. This preference is due in large part to the fact that radiant heating involves direct energy conversion in the sense that persons, plants and animals in the heated areas receive sensible heat via direct energy absorption in their own tissue rather than through the movement of air which has been heated. As a result, people can work comfortably in areas where the actual air temperature is lower than that required for comfort in forced air and convection systems; this, of course, gives rise to substantial energy savings. In addition, a concrete floor under an infrared emitter will absorb energy in the range of frequencies characteristic of radiant tube systems and will thereafter release thermal energy through reradiation to make the enclosure more comfortable and healthful for its inhabitants on an economical basis. Such reradiation from the floor warms the feet of persons working or living in the affected area not only during heating system operation but afterwards as well. Infrared systems have the further advantage in greenhouses and the like of positively affecting plant growth rates.

Low intensity infrared systems have the further advantages of high directionality through the use of reflectors which aim the radiation where it is needed, thus increasing effective utilization.

A low intensity radiant energy heating system of the type previously described is typically installed with the emitter tube 7 to 50 feet above floor level. Reflectors in the form of thin metal fabrications or stampings are installed immediately above the emitter tube over substantially the entire operating length thereof to direct the emitted radiation toward the floor. Due to natural convection between emitter surface and reflector, these thin reflectors become hot and transfer energy from the system to the upper areas, ceiling and roof of the enclosure primarily through two mechanisms: convection currents caused by temperature differences and disturbances within the enclosure actually scrub heat off of the top and sides of the reflector and allow it to move toward the ceiling where it is wasted; in addition, the reflector itself becomes hot enough to reradiate energy from the outside surfaces thereof and this radiation is directed away from rather than toward the area where heating effect is best utilized. Since the reflector of a typical installation provides a large area for heat loss, it becomes a primary factor in low utilization of radiant energy.

SUMMARY OF THE INVENTION

The invention hereinafter described pertains to the construction and operation of a low intensity infrared radiant energy system of the type which comprises an emitter tube and reflector which is located within the enclosure to be heated and which creates a directionalized emission of energy through the conveyance of a hot gaseous effluent from a fuel fired burner through the emitter and ultimately to a location where it is exhausted outside of the enclosure. The word "buffer" is to be construed to refer to a device which comprises a combustion chamber in which a mixture of air and fuel, such as natural gas, propane, LPG or fuel oil, is ignited and the effluent thereof caused by means of pressure differential to flow into and through the emitter tube.

In accordance with a first aspect of my invention, hereinafter described in greater detail with reference to several illustrative embodiments, the reflector which is utilized to direct the output of the emitter tube is insulated so that the inner surface; i.e., the surface directly facing and proximate the emitter tube, and the outer surface are spaced apart and the spacing contains a substance, which may be a dead air, a near vacuum or a commercially available insulation, so as to provide a insulation value which dramatically reduces the temperature of the outer surface relative to the inner surface and reduces both convection and reradiation losses. The inside surface, as before, is highly reflective so as to direct the majority of the emitted radiation toward the area to be heated.

The term "highly reflective" is to be construed as to mean a surface which reflects about 50% or more of infrared wave length radiation directed thereto; as is well known in the art, such surfaces may be provided by means of smooth aluminum, polished metals and foils as well as by other more expensive and elaborate material selections.

In the preferred embodiment hereinafter described, the reflector of the present invention comprises a non-insulating but highly reflecting metal inner member and, spaced therefrom, an outer member which is both reflective and insulated, the space between being essentially a dead air space to enhance the overall R-factor of the insulation and to eliminate both reradiation and convective losses. As hereinafter described the reflector may comprise several intermediate elements and may further include air spaces, grates, screens or covers at the lower end to minimize convection currents and effects due to air disturbances.

In accordance with a second aspect of my invention, I have found it desirable to add fresh air to the enclosure which is heated with my radiant energy system and to utilize a form of the hereinbefore-described insulated reflector to preheat the air before it is admitted the enclosure.

In general, I achieve these objectives by forming the reflector as a closed chamber, and forcing fresh air into this chamber for preheating, and then causing such air to be admitted to the enclosure. Since this has the effect of pressurizing the enclosure, I provide vents from the enclosure to the outside. These vents may be strategically placed to exhaust contaminants such as methane, carbon dioxide, hydrogen sulfide and carbon monoxide and produce a more healthful environment.

This system is advantageous in application to enclosures which house livestock.

DETAILED DESCRIPTION OF THE SPECIFIC EMBODIMENTS

Figure 1:
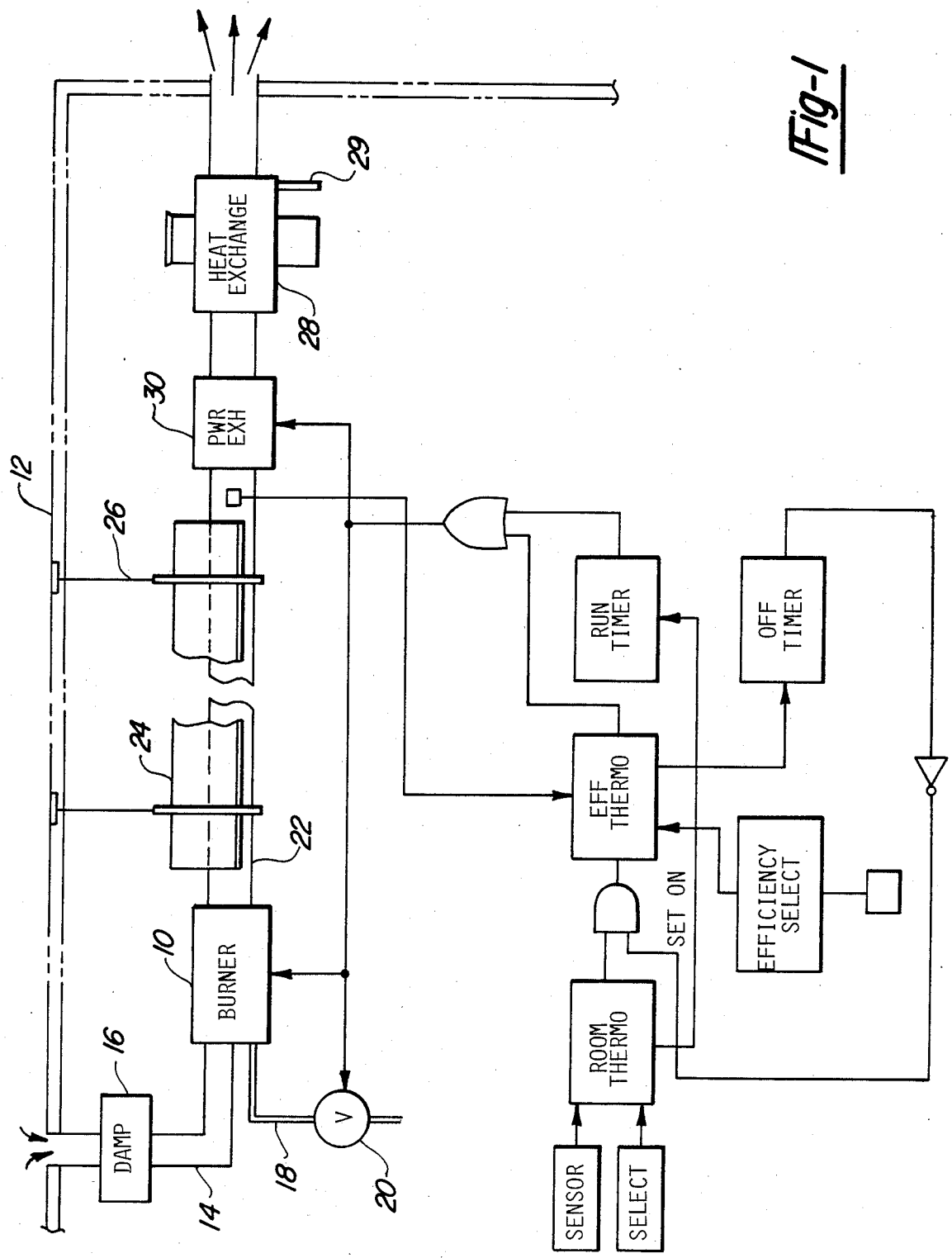
FIG. 1 is schematic diagram of a single burner system illustrating the dual thermostatic control system of the present invention.

Referring now to FIG. 1 a low intensity radiant energy heating system is shown to comprise a gas fired burner 10 located within an enclosure defined by insulated outer walls 12 of a commercial building. The burner is connected through conduit 14 and adjustable damper 16 to the outside of the enclosure to provide air for combination with natural gas supplied to the burner through line 18. Valve 20 may be opened and closed by means of an external electrical control signal to emit gas at line pressure to the burner 10 on demand.

The hot gaseous effluent which is produced by the burner 10 is admitted to the input end of a length of emitter tube 22 which is preferably constructed of light gage spiral wrapped aluminized or coated steel having low thermal inertia and high resistance to corrosion rib and seam reinforced for diametral strength. The length of the tube 22 may vary greatly with the particular installation and, by way of example, the nominal diameter of the tube may be from 2½ to 14 inches. The metal of the tube is preferably from 22 to 31 gage, yielding a weight-to-surface area ratio of one or less. This results in low thermal inertia in the emitter, i.e., heat up and cool down times are short. In contrast, heavy gage welded steel pipes have a weight-to-surface area ratio of 3 to 6.

Over substantially the entire working length of the emitter tube 22 and in spaced and partial surrounding relationship to the tube 22 is a reflector 24 which directs radiant energy from the tube 22 toward the floor of the building 12. Details of the construction of this reflector are described hereinafter with reference to the following figures of the drawing. Hangers 26 are suspended from the ceiling of the building 12 to hold the combination of the tube 22, the burner 10 and the reflector 24 in place.

The tube 22 runs toward and through a power exhaust 30 and a heat exchanger 28 having an acidic condensate drain or trap 29. The now relatively cool effluent is vented to the atmosphere. The heat exchanger 28 is optional in the system, but where used is preferably constructed of materials such as plastic or stainless steel which are highly resistant to corrosion since the function of the heat exchanger is to remove heat from the tube 22 toward the exhaust end and direct it back into the building 12. This function necessarily cools the gaseous effluent in the tube 22 preferably to a temperature below the condensation point. Accordingly an acid drain or trap 29 is necessary so that the condensate may be safely and quickly eliminated from the system. In addition, it is desirable to pitch the cool portion of the system to ensure a flow of condensate to the trap/drain 29.

The power exhaust is also preferably constructed of corrosion resistant materials such as stainless steel. The use of a power exhaust is preferable in most cases to a powered supply system in conduit 14 since the use of a power exhaust causes the entire heating system to operate at a negative internal pressure and this eliminates the possibility of leaking parts of combustion into the building 12 through cracks and holes in the tube 22. The balance of the apparatus shown in FIG. 1 of the drawing is fully described in applicant's co-pending application for U.S. patent, docket no. CRC-055, Ser. No. 06/860,920 filed 5/8/86, now U.S. Pat. No. 4,716,883 filed concurrently with this application and the entire disclosure of that application is incorporated herein by reference.

Looking now to FIGS. 2-5 various constructions for the reflector 24 in the system of FIG. 1 will be described.

Figure 2:
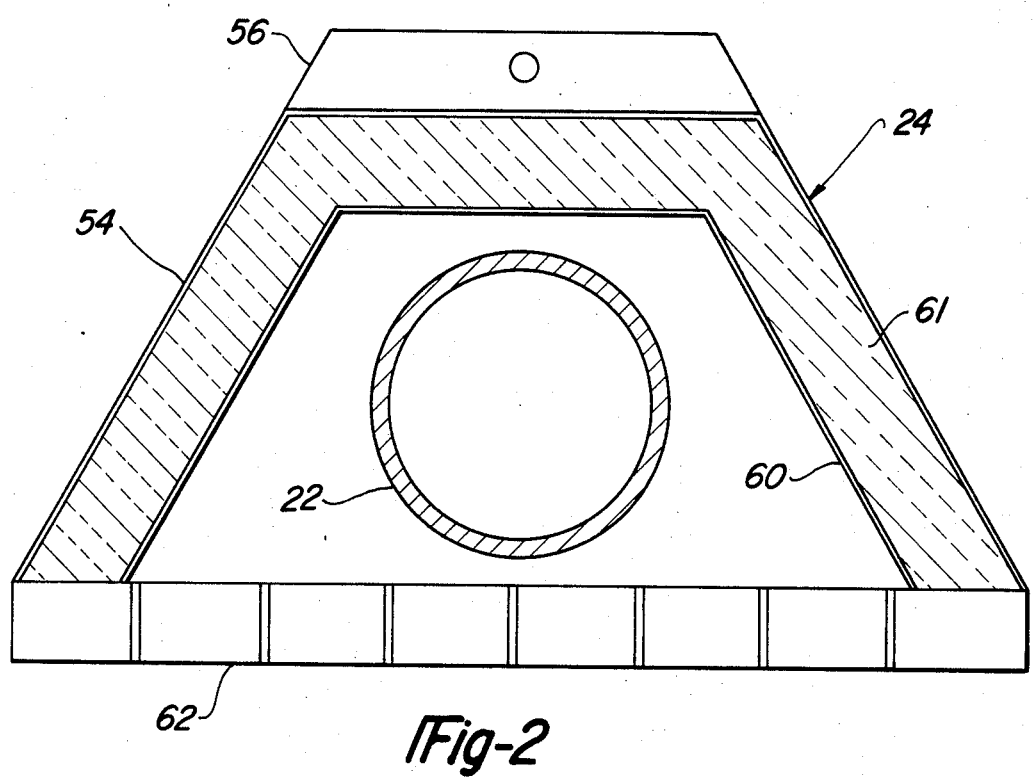
FIG. 2 is a cross-sectional view of a first reflector embodiment.

FIG. 2 illustrates a first embodiment of the reflector 24 which comprises a rigid metal outer shell 54 of generally trapezoidal outline and of sufficient width and height to substantially surround the emitter tube 22; since the tube 22 may vary in diameter from, for example, 3½ inches to ½ inches, the dimensions of the reflector 24 vary correspondingly. Shape may also vary according to the desired heat pattern. Shell 54 is preferably formed integrally with an upper hanger portion 56 at regularly spaced longitudinal intervals. The hangers 56 may alternatively be separately formed and welded, tacked, riveted or otherwise secured in place.

Reflector 24 further comprises an inner reflector 60 of polished metal or bright foil, the reflectivity of which to infrared wavelength radiation is at least 50%. As will be appreciated by those skilled in the art, bright polished thin-gage metal having a reflectivity factor of about 95% is avialable; the higher the reflectivity the less heating effect in the metal due to infrared absorption.

The space between the shells 54 and 60 is filled with an insulative substance 61 which in the embodiment of FIG. 2 may, for example, be standard fiberglas strand insulation or a high temperature, foil backed plastic bubble insulation now commonly available in building supply outlets. The insulative substance, as hereinafter demonstrated through several illustrative embodiments, may take various forms and may in fact be dead air or a partial vacuum; accordingly, the term "substance" is not necessarily to be construed to refer only to solid materials.

Figure 2A:
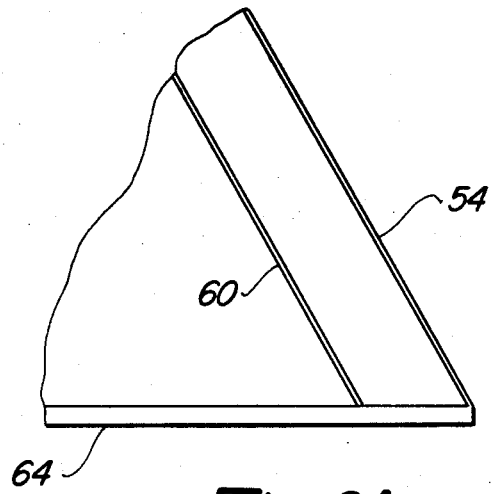
FIG. 2a is a partial cross-sectional view of a modified version of the device of FIG. 2.

Finally, the reflector 24 comprises an egg crate lower panel 62 which is suitably secured to the shell 54 along the outer extremities thereof to prevent air currents and wind caused by disturbances and movements in the heated enclosure from reaching the tube 22 and scrubbing off heat. As shown in FIG. 2a, the egg crate panel 62 may alternatively be replaced with a solid quartz panel 64 which completely closes off the interior of the reflector 24. The quartz panel 64 is essentially invisible to infrared radiation and therefore experiences little or no radiation heating.

The reflector structure of FIGS. 2 and 2a, in operation, produces a very substantial thermal gradient between the interior face of the inner shell 60 and the exterior surfaces of the outer shell 54. Because of this very substantial thermal gradient and the fact that reradiation from the shell 54 is a function of the fourth power of its temperature, heat or energy losses due to reradiation effects in the reflector 24 as a whole are dramatically reduced. In addition, the much lower temperature around the exterior surfaces of shell 54 substantially reduce the circuitous convection currents which normally circulate around the exterior surfaces of a conventional infrared reflector and which contribute to inefficiencies by scrubbing heat off of the body of the conventional single thickness reflector. There will be some convection current flow within the interior volume of the reflector 24 but this does not produce a significant heat loss unless air currents and other disturbances from outside of the reflector enter into, flow through and out of the area immediately surrounding the tube 22 and both the egg crate panel 62 and the quartz panel 64 tend to minimize these currents and the heat losses which might arise therefrom.

It will be understood that the shapes shown in FIGS. 2 and 2a are merely illustrative and the square corners can be eliminated in favor of an elliptical or arcuate configuration as suits the individual designer.

Figure 3:
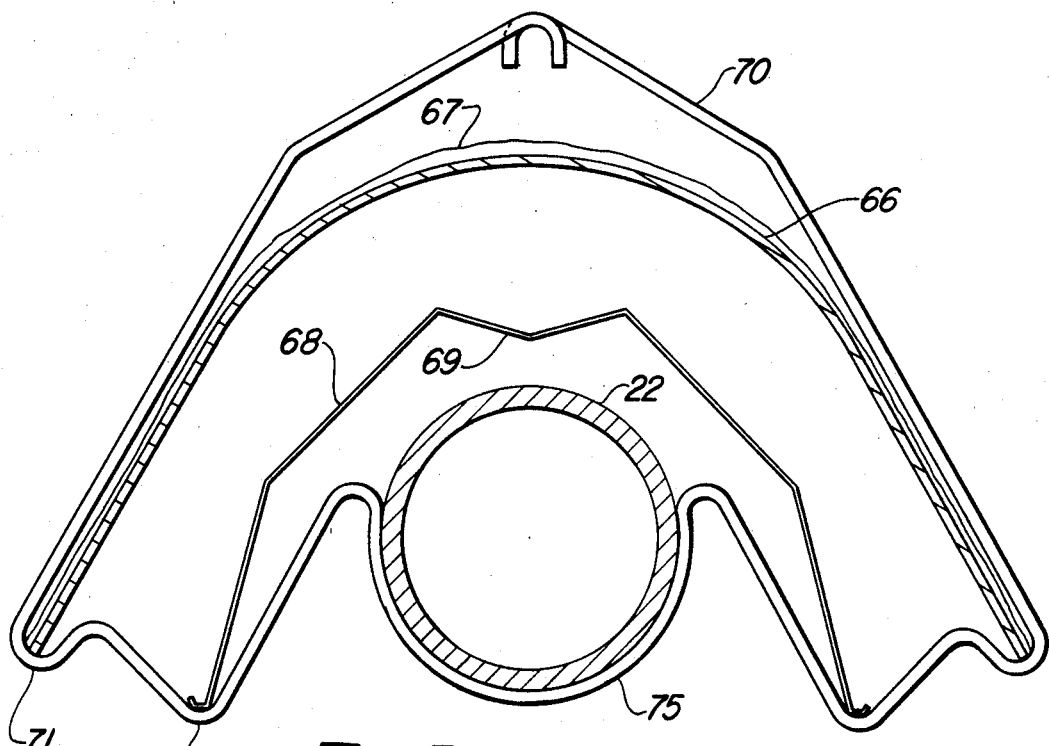
FIG. 3 is a cross-sectional view of a second reflector embodiment.

Looking now to FIG. 3, a second embodiment of the reflector 24 is illustrative in cross section. In this case the reflector 24 comprises an outer shell 66 of steel or other appropriate metal, the inner face of which serves as a secondary reflector to the emitter tube 22. The outer shell 66 may be insulated with fiberglas material 67 so that the outer surface thereof is cool. The reflector 24 of FIG. 3 further comprises a single thickness inner shell 68 which is similar to a standard reflector and which is bent with a reverse peak 69 at the top to minimize the tendency to produce a hot spot immediately above the emitter tube 22. The inner surface of the reflector shell 68 is preferably polished or otherwise brightened to provide a high reflectivity to infrared; i.e. at least 50% reflective and preferably in the 90% range. The entire structure including the tube 22 is held together by means of an alloy steel wire hanger 70 which is bent to provide seats 71 and 73 which receive the opposite lower edges of the outer shell 66 and the inner shell 68 and hold these elements in spaced relationship as shown. The center portion 75 of hanger 70 is curved to receive tube 22. Such a wire hanger 70 occurs at regularly spaced intervals along the longitudinal run of the reflector assembly as will be apparent to those skilled in the art.

Assuming a 6 inch diameter for tube 22, the overall width of the reflector assembly 25 shown in FIG. 3 is about 20 inches and the lateral width of the inner reflector shell 68 at the lower extremities thereof is on the order of 13½ inches. Again, both size and shape are variable.

It will be observed that in the structure of FIG. 3 the "substance" between the inner and outer shells 68 and 66 respectively, which produced the substantial gradient is air.

Figure 4:
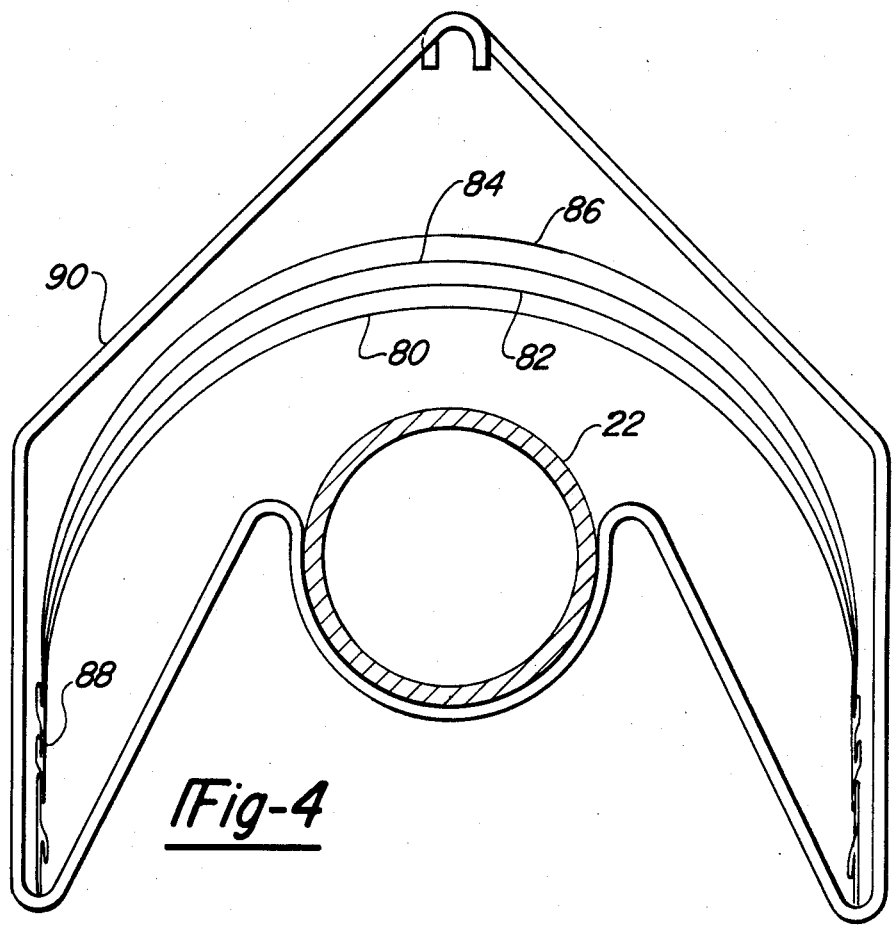
FIG. 4 is a cross-sectional view of a third reflector embodiment.

Looking now to FIG. 4, a still further embodiment of the reflector 24 is shown to comprise an arcuate assembly of radially spaced arcuate shells 80, 82, 84 and 86 of light gage aluminum, polished on both sides, to be highly reflective to infrared radiation. The innermost shell 80 may be formed with a reverse peak as shown in FIG. 3 to eliminate the hot spot which would otherwise occur immediately above the tube 22. Except for this possible variation of the innermost shell 86, all of the shells are formed alike and are secured together by means of a crimping process to form an integrated outer extremity 88 along both edges. This extremity rests in the outermost bight of a suitably formed rigid wire hanger 90, the inner loop of which receives the tube 22 as illustrated. In this embodiment, the "substance" between the outer shell 86 and the inner shell 80 is a combination of additional shells and dead air space. All of the shells 80, 82, 84 and 86 serve as infrared reflectors and the overall combination, because of the insulating value of dead air, produces a substantial temperature gradient between the inside surface of shell 80 and the outside surface of shell 86 dramatically reducing reradiation and convection current effects as previously discussed. The structure of FIG. 4 is based on the proposition that relatively little insulation is needed at the opposite lateral extremities of the reflector 24 because there is relatively little horizontal convective heat transfer between the tube 22 and that portion of the reflector whereas there is a strong vertical convective heat transfer from the tube 22 to the top of the reflector and in this area the spacing between the shells 80, 82, 84 and 86 is maximized. In short, the structure of FIG. 4 places the insulation effect where it is needed most and gradually reduces it in the areas of lesser necessity.

The reflectors of FIGS. 2-4 may be used to advantage in a single set-point system as well as the double set-point system of FIG. 1. In addition, and as an alternative, the aluminized conduit 14 may be coated with a material such as black paint to increase emissivity.

Figure 5:
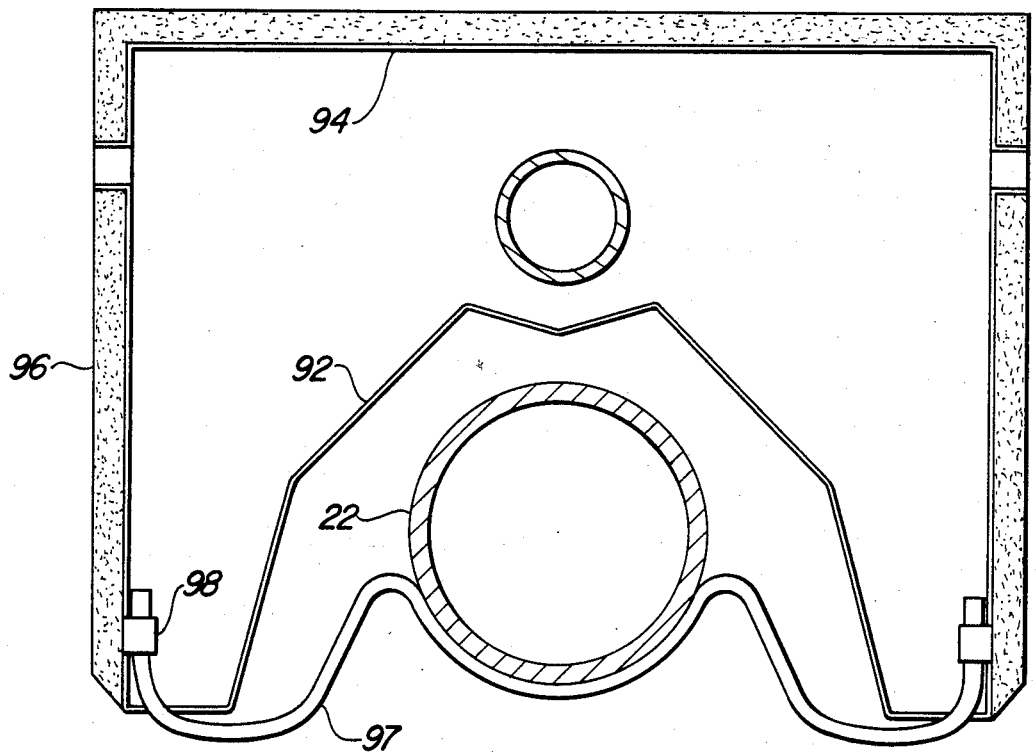
FIG. 5 is a sectional view of a still further embodiment of the invention.
Figure 6:
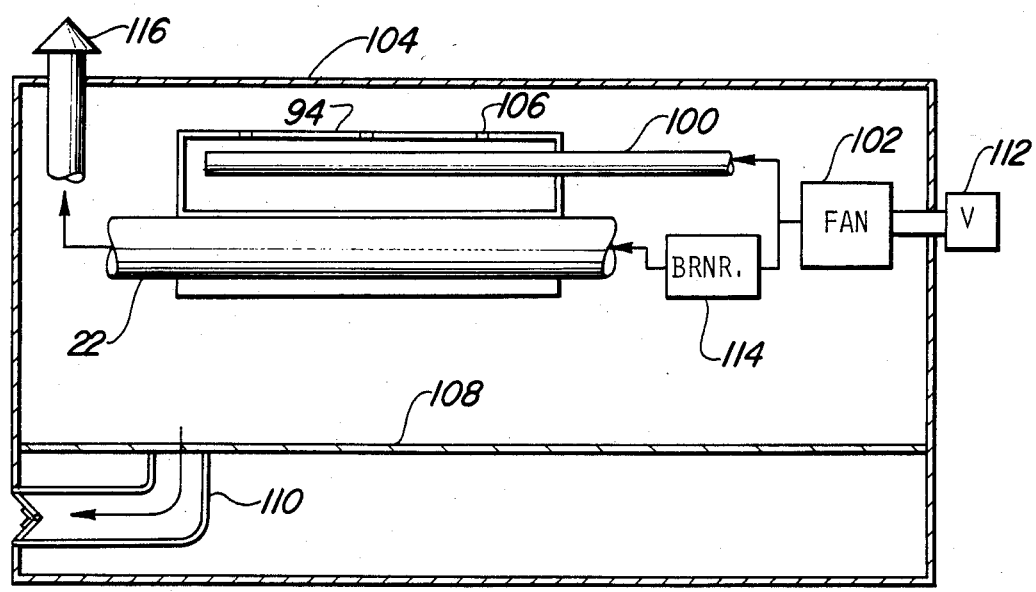
FIG. 6 is a schematic view of a combined radiant heating and fresh air system using the reflector of FIG. 5.

Looking now to FIGS. 5 and 6, a closed reflector system having a fresh air supply is shown.

Emitter tube 22 extends horizontally within a polished reflector 92 which is integral with a closed housing 94 of metal. The side walls and top of housing 94 are covered with insulation 96. Hanger wires 97 are connected to the housing 94 by tabs 98 and also hold the tube 22.

A fresh air supply conduit 100 runs within housing 94 parallel to and above tube 22 and carries outside air supplied by a fan 102 which draws from the air outside the building via a damper or check valve 112. Fan 102 also supplies combustion air to burner 114. Air passing through conduit 100 is warmed and dried as the interior of the housing 94 receives heat from tube 22. Vent holes 106 in housing 94 allow the warmed fresh air to enter the building 104.

As best shown in FIG. 6, building 104 has a working surface 108 which may, for example, be a grate or floor of an animal confinement area on which livestock such as pigs live. This surface 108 is provided with vents 110 to the outside such that the pressurization of the building caused by fan 102 forces air from the vicinity of the surface 108 out of the building 104. Air in this vicinity is most likely to be contaminated with methane gas from manure and the venting of same to the outside air promotes the health of the animals living in the building 104.

Tube 22 is charged with effluent by a conventional burner 114 receiving outside air from fan 102. Effluent from tube 22 is exhausted at 116. It can be seen that the combustion air enters the system from outside the building and is exhausted back to the outside. Therefore, the heating system per se supplies no fresh air to building 104. Modern construction and insulation provides a fairly air-tight structure, giving rise to a need of ventilation of the type provided by the system of FIGS. 5 and 6.

I claim:

1. In combination:
an elongate tubular conduit adapted to be heated by a hot gaseous effluent and capable of emitting infrared radiation when so heated; and
an insulated reflector mounted in spaced and partially surrounding relationship above said conduit to direct radiation downwardly therefrom, said reflector having spaced inner and outer concave reflective structures and a substance therebetween which produces relatively low thermal conductivity and a relatively high insulation value,
said inner reflective structure comprising a first concave metal member having an inner surface which is highly reflective to infrared radiation,
said outer reflective structure comprising a second concave metal member providing a highly reflective inner surface and a layer of insulation material on the outer surface of said second metal member.

2. Apparatus as defined in claim 1 wherein the substance between the reflective structures is air.

3. Apparatus as defined in claim 1 wherein said reflector forms a substantially closed elongated chamber above said emitter conduit between said inner and outer reflective structures; the combination further comprising means for supplying air to said chamber, and at least one opening in said chamber to release air therefrom.

4. In a radiant energy heating system of the type including an elongate emitter tube adapted to be charged with hot gaseous fluid from a burner;
a reflector for use above and effectively partially surrounding the emitter tube to direct radiation downwardly therefrom, said reflector comprising a single ply elongated metal sheet having a highly reflective surface facing the emitter tube and having a downwardly opening concave cross section;
a second elongated, concave body generally conforming to but spaced above said sheet, and
a plurality of hanger members adapted to be secured at their upper ends to an overhead support and configured at their lower ends to provide a central seat to receive said tube and further seats on both sides of said central seat to respectively receive the transversely spaced longitudinal edges of said sheet and of said body.

5. Apparatus as defined in claim 4 wherein said sheet and body longitudinal edges on one side of the tube are mechanically joined together, said sheet and body longitudinal edges on the opposite side of the tube are mechanically joined together, and the joined edges on each side of said tube seat in a single seat defined by said hangers.

6. Apparatus as defined in claim 5 wherein said body is also a metal sheet.

7. Apparatus as defined in claim 4 wherein said body comprises a sheet ply and an insulator ply joined to said sheet ply.

8. Apparatus as defined in claim 4 wherein said reflector and said body form a substantially closed chamber adjacent said emitter conduit; the combination further comprising means for supplying fresh air to said chamber, and at least one opening in said chamber to release air therefrom.

9. In combination:
an elongate tubular conduit adapted to be heated by hot gaseous effluent and capable of emitting infrared radiation when so heated,
and reflector means mounted in space relation to said conduit and surrounding at least a portion of said conduit, said reflector means comprising an inner reflector and an outer reflector, the inner and outer reflectors being spaced apart and each having a reflective inner surface facing said emitter tube, only the outer reflector being provided with insulation material.

10. A radiant heating system for an enclosure comprising:
a burner;
an elongated emitter tube arranged to receive the effluent from said burner and adapted to be positioned generally horizontally within the enclosure in downwardly spaced relation to the roof of the enclosure;
an elongated reflector structure mounted above and along said tube and including a lower concave reflective wall partially surrounding said tube and directing radiation downwardly therefrom and an upper wall spaced above said lower wall and defining a closed, elongated chamber therebetween;
means for delivering fresh air from outside of said enclosure into said chamber; and
at least one opening in said chamber to allow said fresh air to enter the enclosure.

11. A radiant heating system according to claim 10 wherein:
said means for supplying fresh air comprises an elongated fresh air tube communicating at one end thereof with a source of fresh air and extending at its other end into said chamber to deliver fresh air to said chamber.

12. A radiant heating system according to claim 11 wherein:
said source of fresh air includes a fan arranged to draw fresh outside air into the enclosure and supply it to said fresh air tube.

13. A radiant heating system according to claim 12 wherein:
said fan is also arranged to supply combustion air to said burner.

14. In combination:
an elongate tubular conduit adapted to be heated by hot gaseous effluent and capable of emitting infrared radiation when so heated; and
an insulated reflector mounted in spaced and partially surrounding relationship with said conduit, said reflector having spaced inner and outer surfaces and a solid insulative material therebetween which produces relatively low thermal conductivity and a relatively high insulation value,
the inner surface being highly reflective to infrared radiation, said reflector surroundingly enclosing at least an included angle of 180° measured around the emitter tube,
said combination further including bottom closure means connected transversely between the lower ends of the laterally opposite legs of the reflector to reduce air currents around the emitter tube.

15. In a radiant energy heating system of the type including an elongate emitter tube adapted to be charged with hot gaseous fluid from a burner;
a reflector for use above and effectively partially surrounding the emitter tube to direct radiation downwardly therefrom, said reflector comprising a single ply elongated metal sheet having a highly reflective surface facing the emitter tube and having a downwardly opening concave cross section;

a second elongated, concave body generally to be secured at their upper ends to an overhead support and configured at their lower ends to provide seats to respectively receive said tube and the transversely spaced longitudinal edges of said sheet and of said body; and the respective longitudinal edges of said sheet being spaced from the respective longitudinal edges of said body and said hangers being configured to provide separate transversely spaced seats for the longitudinal edges of said sheet and for the longitudinal edges of said body.

* * * * *